(12) United States Patent
Wu et al.

(10) Patent No.: US 12,205,193 B2
(45) Date of Patent: Jan. 21, 2025

(54) DEVICE AND METHOD OF IMPLEMENTING SUBPASS INTERLEAVING OF TILED IMAGE RENDERING

(71) Applicant: Advanced Micro Devices, Inc., Santa Clara, CA (US)

(72) Inventors: Ruijin Wu, Irvine, CA (US); Michael John Livesley, Milton Keynes (GB); Kiia Kallio, Inkoo As (FI); Jan H. Achrenius, Helsinki (FI); Mika Tuomi, Noormarkku (FI)

(73) Assignee: Advanced Micro Devices, Inc., Santa Clara, CA (US)

( * ) Notice: Subject to any disclaimer, the term of this patent is extended or adjusted under 35 U.S.C. 154(b) by 42 days.

(21) Appl. No.: 17/955,499

(22) Filed: Sep. 28, 2022

(65) Prior Publication Data

US 2024/0104685 A1  Mar. 28, 2024

(51) Int. Cl.
*G06T 1/20* (2006.01)
*G06T 15/00* (2011.01)
*G06T 17/10* (2006.01)

(52) U.S. Cl.
CPC ............ *G06T 1/20* (2013.01); *G06T 15/00* (2013.01); *G06T 17/10* (2013.01)

(58) Field of Classification Search
CPC ............ G06T 1/20; G06T 15/00; G06T 17/10
USPC ........................................................ 345/418
See application file for complete search history.

(56) References Cited

U.S. PATENT DOCUMENTS

2017/0053375 A1\* 2/2017 Bolz ..................... G09G 5/363
2022/0036632 A1\* 2/2022 Krisch ................... G06F 9/544

\* cited by examiner

*Primary Examiner* — Hai Tao Sun
(74) *Attorney, Agent, or Firm* — Volpe Koenig

(57) ABSTRACT

Devices and methods method of tiled rendering are provided which comprises dividing a frame to be rendered, into a plurality of tiles, receiving commands to execute a plurality of subpasses of the tiles, interleaving execution of same subpasses of multiple tiles of the frame by executing one or more subpasses as skip operations, storing visibility data, for subsequently ordered subpasses of the tiles, at memory addresses allocated for data of corresponding adjacent tiles in a first direction of traversal and rendering the tiles for the subsequently ordered subpasses using the visibility data stored at the memory addresses allocated for corresponding adjacent tiles in a second direction of traversal, opposite the first direction of traversal.

20 Claims, 13 Drawing Sheets

DEVICE AND METHOD OF IMPLEMENTING SUBPASS INTERLEAVING OF TILED IMAGE RENDERING

BACKGROUND

Graphics processing includes the rendering of a three dimensional (3D) scene onto a two dimensional (2D) screen. The 3D scene is rendered on a display screen, via a graphics pipeline, which includes different stages of processing. Graphics processing commands of a command stream are received (e.g., from an application) and computation tasks are provided (e.g., to an accelerated processing device, such as a GPU) for execution of the tasks.

Graphics are rendered on a display screen using primitives (e.g., triangles, quadrilaterals or other geometric shapes). The graphics processing commands include, for example, the number of primitives, the location of each primitive and attributes of each primitive to be rendered on the display screen.

BRIEF DESCRIPTION OF THE DRAWINGS

A more detailed understanding can be had from the following description, given by way of example in conjunction with the accompanying drawings wherein.

DETAILED DESCRIPTION

Figure 1:
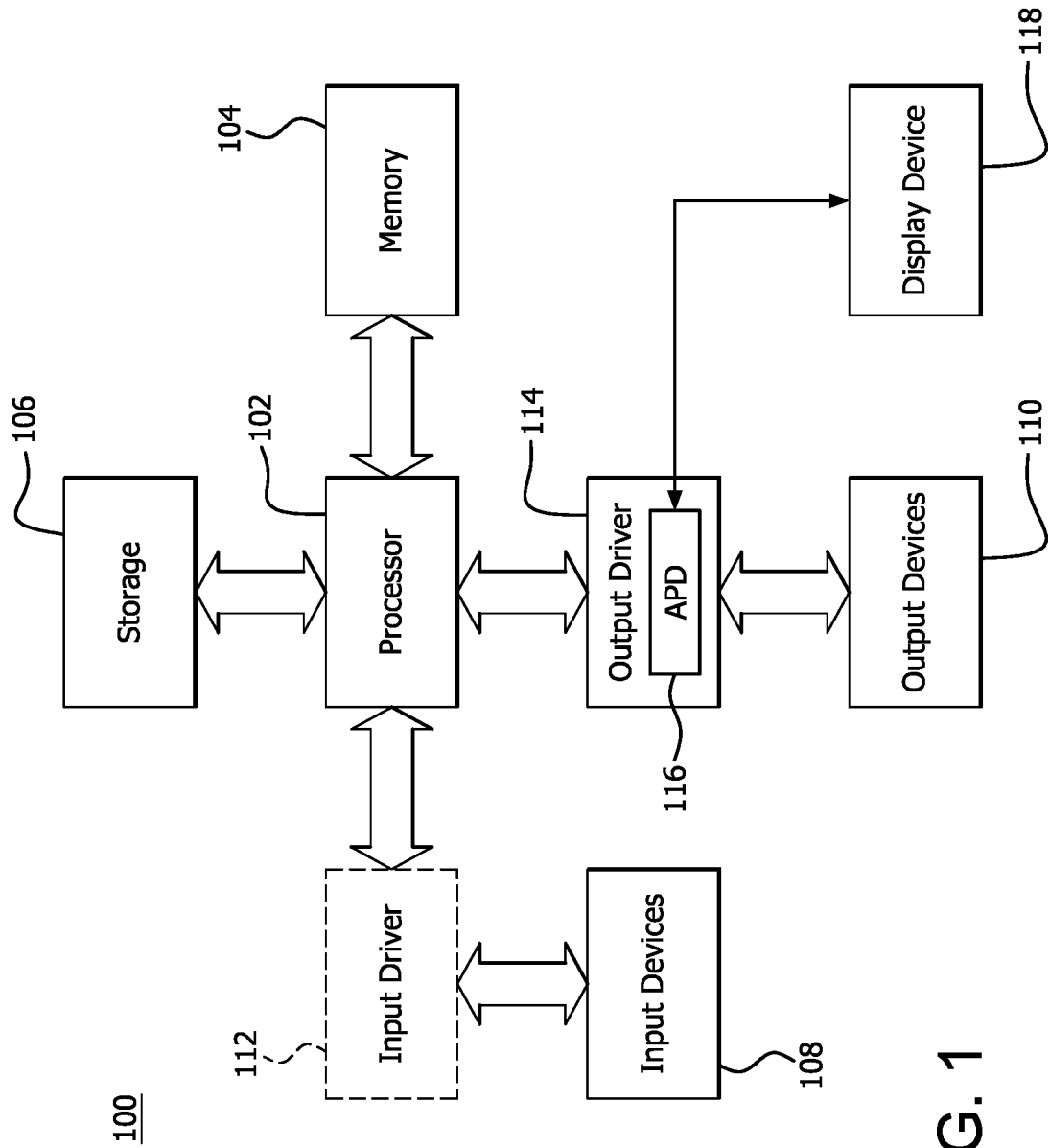
FIG. 1 is a block diagram of an example device in which one or more features of the disclosure can be implemented.

The terms "tile," "bin," "tiled," "binned," "tiling" and binning are used interchangeably herein.

The graphics pipleline can be simplified to include a front end geometry portion and a back end portion. For example, the front end geometry portion of the pipeline includes several shader stages (e.g., vertex shader stage, hull shader stage, tesselator stage, domain shader stage and geometry shader stage). During the shader stages, the primitives are received as 3D objects and transformed to 2D objects to be rendered onto a 2D screen. The back end portion includes a rasterizer stage and pixel shader stage. During the rasterizer stage, an on-screen location of each primitive to be projected onto the 2D screen is determined. For example, during rasterization, an accelerated processing device (e.g., GPU) determines, for each primitive, which pixels (or sub-pixel samples) correspond to each primitive to be rendered onto the 2D screen. During the pixel shader stage, values (e.g., brightness and color) are calculated for the pixels corresponding to the primitives.

Rendering a frame includes performing different tasks in a particular order. For example, frame rendering includes shadow rendering, a render pass and post processing. The render pass includes various subpasses (e.g., visibility subpasses) performed in a particular order. A subpass is a sequence of draw commands that render to the same render target.

The commands (i.e., instructions) for subpasses are stored (e.g., in a command buffer) in a particular order and issued to the processor (e.g., scheduler of a GPU) in the particular order in the buffer because, in some cases, subsequent subpasses depend on the output data from a previous subpass before executing. The data resulting from the execution of each subpass is typically stored in a cache (e.g., a render backend (RB) cache). Execution of a subsequent task, however, relies on reading the data from another portion of memory (i.e., not from the RB cache). Therefore, the data from the RB cache is flushed and stored in another portion of memory, such as a lower level cache (e.g., level 2 (L2) cache or other lower level cache) or main memory so that the data can be read to execute the subsequent task.

A subsequently ordered subpass in the command buffer depends on the data resulting from a previously ordered subpass Before a subsequently ordered subpass in the command buffer can begin executing (i.e., before any work can begin by the subsequently ordered subpass), the previously ordered subpass in the command buffer must finish executing (i.e., the output data is flushed from the cache and the data is stored in another portion of memory). Accordingly, in this case, when a subsequently ordered subpass has to wait for a previously ordered subpass to complete, overhead (e.g., latency) is introduced in the processing pipeline. In addition, during this waiting period, the processor is idle until the previously ordered subpass completes, resulting in inefficiencies in the pipeline and increased frame latency.

Tiling (or binning) is a technique which splits a frame into sections (e.g., tiles or bins) and renders one tile of a frame before rendering another tile of the frame. For example, if a frame (or image) is split into four equal tiles (i.e., top left quadrant, top right quadrant, bottom left quadrant and bottom right quadrant), a first tile (e.g., top left quadrant) is rendered before proceeding to render one of the next tiles. Then, one of the other tiles (e.g., top right quadrant) is rendered before proceeding to render one of the last two tiles, and so on, until each of the tiles of the frame are rendered.

In conventional tiled (binned) rendering, each of the bins are rendered independent of each other. When rendering a tile (or bin), different subpasses of the same tile (or bin) must execute in the order specified in the command buffer so that a subsequently ordered subpass of the same tile can read the data resulting from the execution of the previously ordered subpass. Accordingly, because a subsequently ordered subpass of a tile must wait for the previously ordered subpass of the same tile to complete, the latency is introduced in the processing pipeline.

The present application discloses apparatuses and methods which exploit these attributes of tiled (binned) rendering and provide a more efficient processing pipeline by interleaving same subpasses of multiple bins (e.g., a first lighting subpass of bin 1 and a same first lighting subpass of bin 2). Features of the present application interleave the execution of a same subpass (i.e., same subpass type) of a different tile during the time period when a subsequently ordered subpass (different from a previously ordered subpass) of a same tile is waiting for the previously ordered subpass of the same tile to complete. Accordingly, because these time periods, during which subsequently ordered subpasses of a same tile are waiting, are used to execute one or more subpasses of a different tile, the overall latency is reduced. In addition, because the processor is executing one or more subpasses of a different tile during this time period in which the subsequently ordered subpass of a same tile is waiting, the processor is not idle during this time period, resulting in a more efficient use of resources. In addition, features of the present application also utilize the ability to process subpasses in parallel, via an accelerated processing device (e.g., GPU), by overlapping (in time) the execution of same subpasses of different bins to further reduce the latency.

In a first example mode, subpasses of consecutive bins are interleaved by executing the subpasses in an order different from the order in which the subpass commands are stored (e.g., in a command buffer) and issued to the processor (e.g., scheduler of a GPU). In a second example mode, subpasses of consecutive bins are interleaved by executing subpasses as skip operations such that the subpasses are executed in the same order in which the subpass commands are stored and issued to the processor. The interleaving mode to be implemented and the number of interleaved same subpasses of multiple bins are determined on a per frame basis or multiple frame basis prior to rendering a frame.

Due to the skip operations used in the second example mode, a processor will execute subsequently ordered subpasses of some tiles by using (e.g., reading) the data resulting from the execution of a previously ordered subpasses of different corresponding tiles (i.e., wrong tiles).

Features of the present disclosure provide devices and methods of efficiently performing subpass interleaving for tiled image rendering by skipping execution of subpasses such that the execution order is the same as the command order, while executing subsequently ordered subpasses of the tiles by using (e.g., reading) the data resulting from the execution of previously ordered subpasses of same corresponding tiles.

The data of tiles is stored at memory addresses according to a subpass identifier (ID) which identifies a particular subpass. During a visibility generation phase, the visibility data of the tiles for subsequently ordered subpasses is stored at the memory addresses allocated for data of corresponding adjacent tiles (i.e., immediate subsequent tile or immediately preceding tile depending on a direction of traversal) and the data of one or more tiles which are pushed out is stored at additional memory addresses reserved for the pushed out tiles. Then, during the rendering phase, the tiles for subsequently ordered subpasses are rendered using the data stored at the memory addresses allocated for corresponding adjacent tiles in the opposite direction (i.e., opposite direction of traversal).

For example, when forward traversal is used (e.g., Tile 1, Tile 2, . . . Tile N), during a visibility generation phase, the visibility data of the tiles for subsequently ordered subpasses is stored at the memory addresses allocated for data of the corresponding immediate subsequent tiles (i.e., the corresponding next tile in the forward order of traversal) and the data of one or more tiles which are pushed out (i.e., one or more tiles at the end of the frame) of memory is stored at additional memory addresses reserved for the pushed out tiles. Then, because the data is shifted forward during the visibility pass, during the rendering phase the tiles for subsequently ordered subpasses are rendered using the data stored at the memory addresses allocated for the corresponding immediately preceding tiles (i.e., the corresponding previous tile in the backward order of traversal).

When backward traversal is used (e.g., Tile N, Tile N−1, . . . Tile 1) during the visibility generation phase, the visibility data of the tiles for subsequently ordered subpasses is stored at the memory addresses allocated for data of the corresponding immediately preceding tiles (i.e., the corresponding previous tile in the forward order of traversal) and the data of one or more tiles which are pushed out (i.e., one or more tiles at the end of the frame) is stored at additional memory addresses reserved for the pushed out tiles. Then, because the data is shifted backward during the visibility pass, during the rendering phase the tiles for subsequently ordered subpasses are rendered using the data stored at the memory addresses allocated for the corresponding immediately subsequent tiles (i.e., the corresponding next tile in the forward order of traversal).

A method of tiled image rendering is provided which comprises dividing a frame to be rendered, into a plurality of tiles, receiving commands to execute a plurality of subpasses of the tiles, interleaving execution of same subpasses of multiple tiles of the frame by executing one or more subpasses as skip operations, storing visibility data, for subsequently ordered subpasses of the tiles, at memory addresses allocated for data of corresponding adjacent tiles in a first direction of traversal and rendering the tiles for the subsequently ordered subpasses using the visibility data stored at the memory addresses allocated for corresponding adjacent tiles in a second direction of traversal, opposite the first direction of traversal.

A processing device used for tiled image rendering is provided which comprises memory and a processor. The processor is configured to divide a frame to be rendered, into a plurality of tiles receive commands to execute a plurality of subpasses of the tiles, interleave execution of same subpasses of multiple tiles of the frame by executing one or more subpasses as skip operations, store visibility data, for subsequently ordered subpasses of the tiles, at memory addresses allocated for data of corresponding adjacent tiles in a first direction of traversal and render the tiles for the subsequently ordered subpasses using the visibility data stored at the memory addresses allocated for corresponding adjacent tiles in a second direction of traversal, opposite the first direction of traversal.

A non-transitory computer readable medium is provided which comprises instructions for causing a computer to execute a method of tiled image rendering. The instructions comprise dividing a frame to be rendered, into a plurality of tiles, receiving commands to execute a plurality of subpasses of the tiles; interleaving execution of same subpasses of multiple tiles of the frame by executing one or more subpasses as skip operations, storing visibility data, for subsequently ordered subpasses of the tiles, at memory addresses allocated for data of corresponding adjacent tiles in a first direction of traversal and rendering the tiles for the subsequently ordered subpasses using the visibility data stored at the memory addresses allocated for corresponding adjacent tiles in a second direction of traversal, opposite the first direction of traversal.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
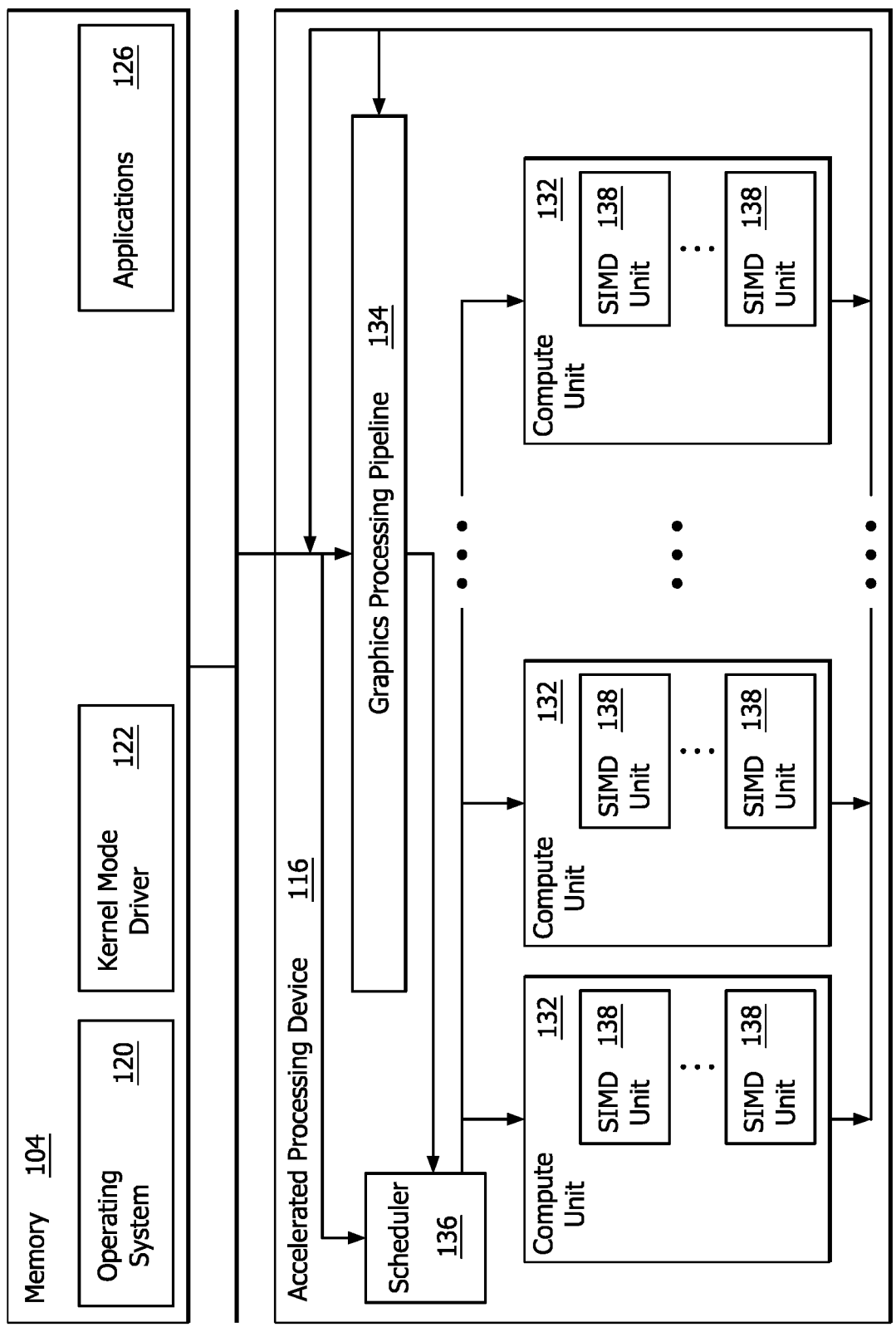
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to implement features of the present disclosure by executing a plurality of functions. For example, the APD 116 is configured to receive images (i.e., frames), divide images into a plurality of tiles, receive subpass commands, via user mode driver 200, interleave same subpasses of multiple bins according to a first example mode by executing the subpasses in an order different from the order in which the subpass commands are stored and issued to the processor, interleave same subpasses of multiple bins according to a second example mode by skipping execution of subpasses such that the subpasses are executed in the same order in which the subpass commands are stored and issued to the processor, determining an interleaving mode and a number of interleaved same subpasses of multiple bins on a per frame basis or multiple frame basis prior to rendering a frame.

APD 116 is configured to perform various tasks to implement the second example mode, including interleaving execution of same subpasses of multiple tiles of the frame by executing one or more subpasses as skip operations, storing visibility data, for subsequently ordered subpasses of the tiles, at memory addresses allocated for data of corresponding adjacent tiles in a first direction of traversal and rendering the tiles for the subsequently ordered subpasses using the visibility data stored at the memory addresses allocated for corresponding adjacent tiles in a second direction of traversal, opposite the first direction.

Figure 3:
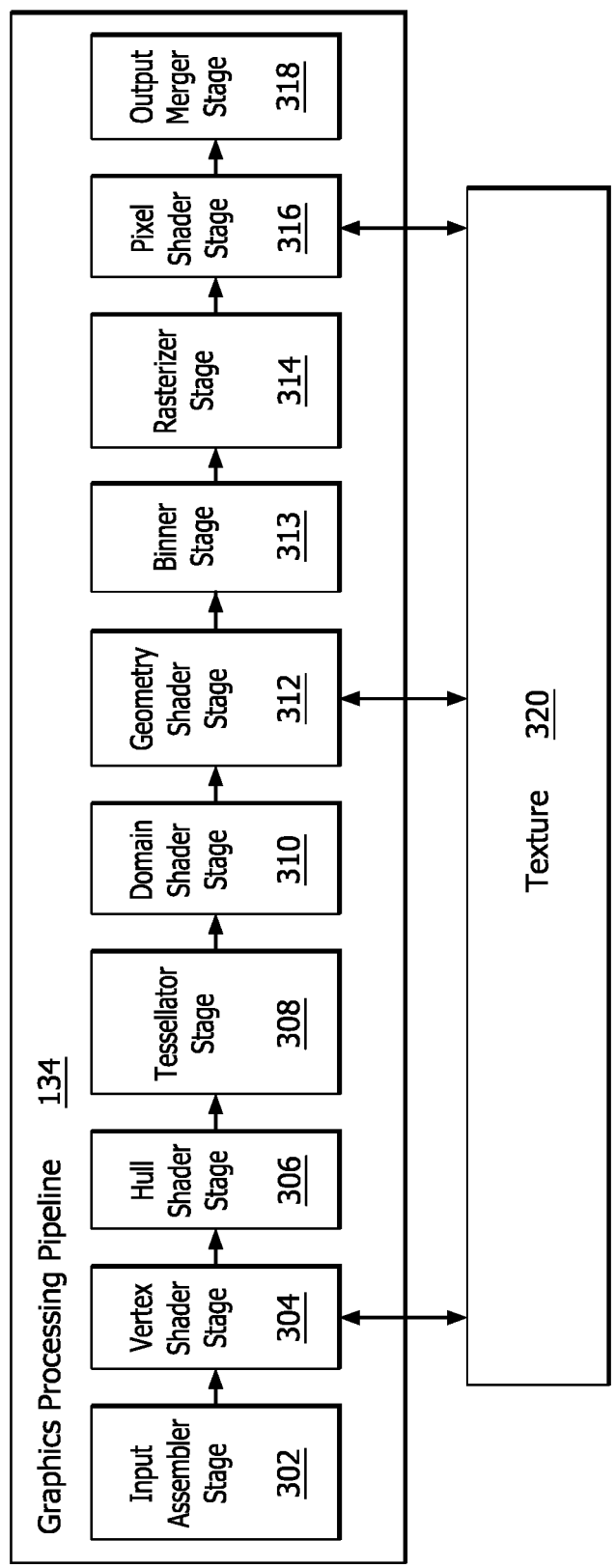
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

Stages 302 to 313 represent the front end geometry processing portion of the graphics processing pipeline 134. Stages 314 to 318 represent the back end pixel processing portion of the graphics processing pipeline 134.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cube map, per-primitive material swapping, and per-primitive material setup. In some instances, a shader program that executes on the programmable processing units 202 perform operations for the geometry shader stage 312.

The binner stage 313 is the last stage of the front end processing. The binner stage performs a coarse rasterization to determine if a tile (or bin) of the frame (or image) overlaps with primitives. For example, the binner stage includes visibility checking (i.e., a visibility pass) and tile walking for the primitives determined to be in each tile. The binner stage 313 is performed by fixed function hardware.

As described above, stages 314-318 represent the back end processing of the graphics processing pipeline 134. The rasterizer stage 314 accepts and rasterizes simple primitives and generated upstream. Rasterization includes determining which screen pixels (or sub-pixel samples) are covered by a particular primitive. For example, the rasterizer stage 314 converts the primitive (e.g., a triangle) to screen space pixels, testing which pixel is covered by the primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
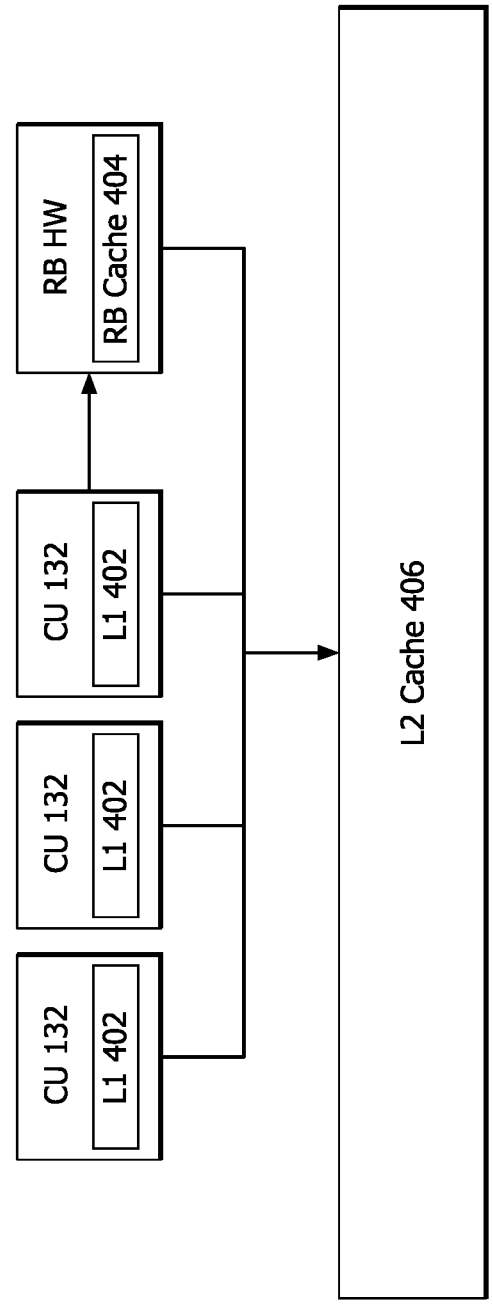
FIG. 4 is a block diagram illustrating example components of an accelerated processing device in which one or more features of the disclosure can be implemented.

FIG. 4 is a block diagram illustrating example components of the APD 116 shown in FIG. 2 in which one or more features of the disclosure can be implemented. As shown in FIG. 4, the APD 116 includes compute units 132, each having an L1 cache. Each compute unit communicates with rendering back end (RB) which is implemented via fixed function hardware. The output data resulting from the execution of subpasses (e.g., subpass 0, subpass 1 and subpass 2 shown in FIG. 5) is stored in the RB cache. The output data from a previously ordered subpass is flushed from the RB cache and provided to another portion of memory, such as L2 cache 406 shown in FIG. 4, and the data is read by the subsequently ordered subpass for execution.

Figure 5:
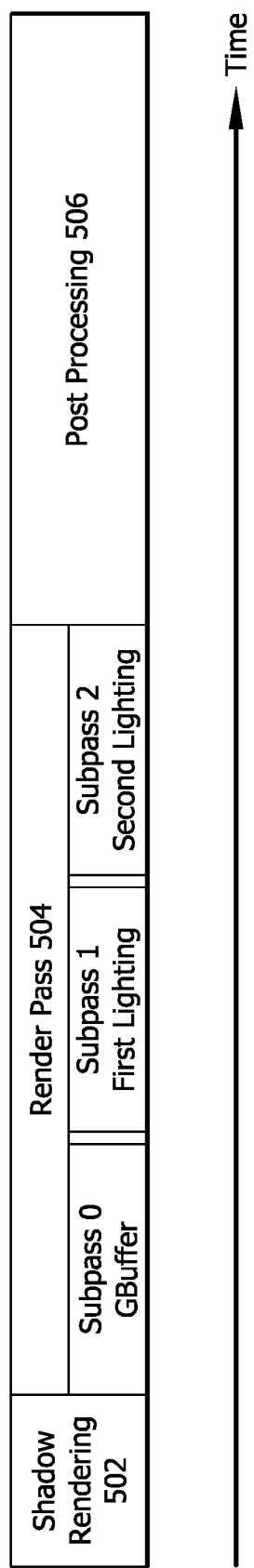
FIG. 5 is a diagram of a portion a graphics processing pipeline illustrating the ordering of different rendering subpasses according to an example.

FIG. 5 is a diagram of a portion a graphics processing pipeline illustrating the ordering of different rendering subpasses according to an example. The frame rendering includes shadow rendering 502, a render pass 504 and post processing 506. For simplified explanation purposes, the render pass 504 in the example shown in FIG. 5 includes three subpasses, namely a geometry buffer (GBuffer) rendering subpass (i.e., subpass 0), a first lighting (light 1) subpass (i.e., subpass 1) and a second lighting subpass (i.e., subpass 2). The number of subpasses and the types of subpasses shown in FIG. 5 is merely an example. Features of the disclosure can be implemented using different numbers of subpasses and different types of subpasses different from those shown in FIG. 5.

As described above, before a subsequently ordered subpass (e.g., subpass 1 in FIG. 5) in the command buffer can begin executing (i.e., before any work can begin by the subsequently ordered subpass), a previously ordered subpass (e.g., subpass 0 in FIG. 5) in the command buffer must finish executing (i.e., the output data is flushed from the cache and the data is stored in another portion of memory). Accordingly, when subpass 1 has to wait for subpass 0 to complete, overhead (e.g., latency) is introduced in the processing pipeline. In addition, during this waiting period, the processor is idle until subpass 0 completes, resulting in inefficiencies in the pipeline and increased frame latency.

Figure 6:
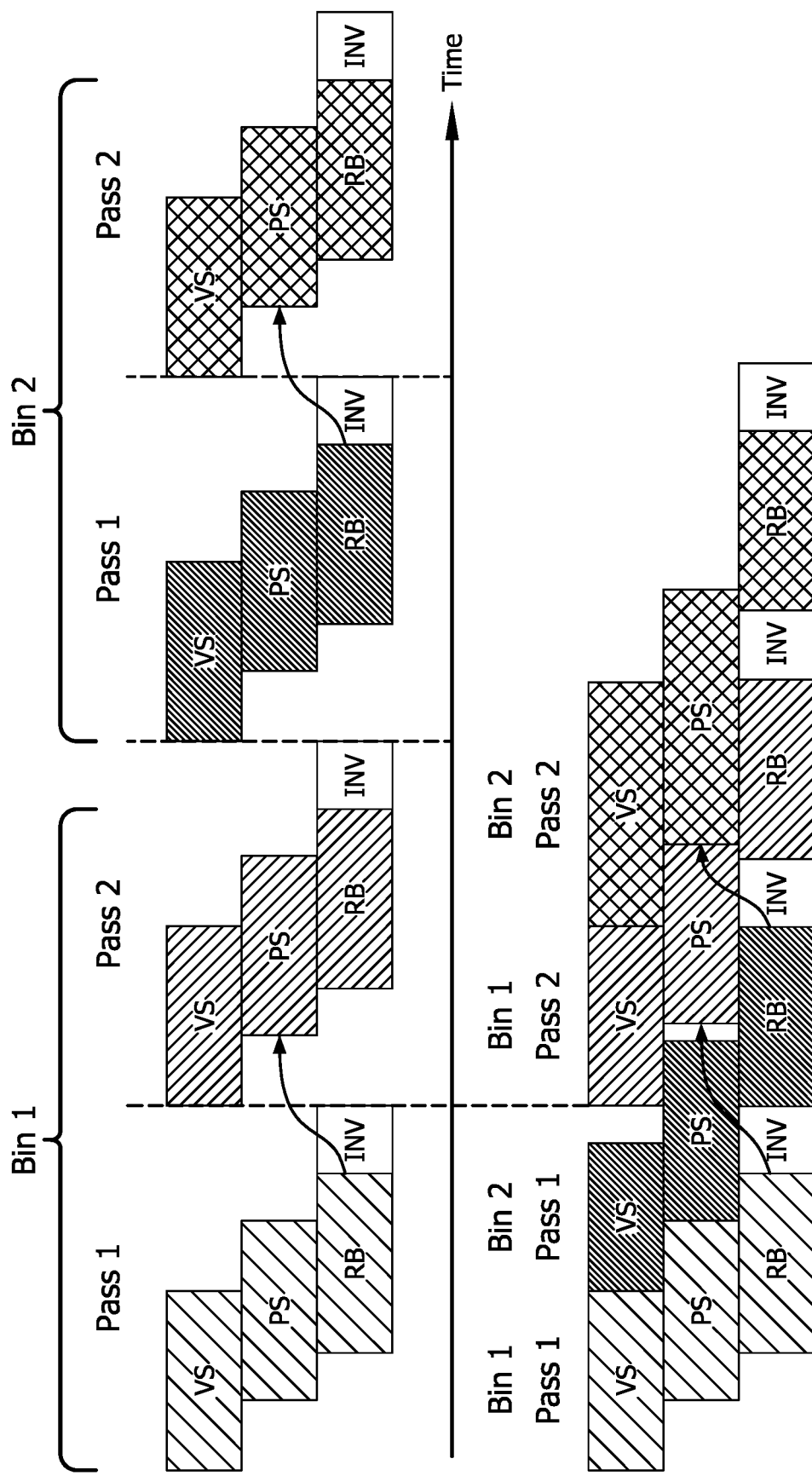
FIG. 6 shows timing diagrams illustrating the performance benefits of implementing an example of interleaving subpasses of consecutive bins.

FIG. 6 shows timing diagrams illustrating the performance benefits of implementing an example of interleaving subpasses of consecutive bins. In particular, FIG. 6 illustrates the performance benefits (e.g., decreased latency) between the execution of two different subpasses of consecutive bins without interleaving and execution by interleaving the two different subpasses of the consecutive bins. Two subpasses and two bins are illustrated in FIG. 6 for simplified explanation. Features of the disclosure can be implemented using more than two subpasses and more than two bins.

The timing diagram at the top portion of FIG. 6 illustrates execution of two different subpasses (i.e., Pass 1 and Pass 2) of two consecutive bins (i.e., bin 1 and bin 2) without interleaving. The timing diagram at the bottom portion of FIG. 6 illustrates interleaving the two different subpasses (i.e., Pass 1 and Pass 2) of bins 1 and 2 according to features of the present disclosure. For simplified explanation purposes, each of the example subpasses shown in FIG. 6 include 3 stages (i.e., a vertex shader (VS) stage, a pixel shader (PS) stage and an RB stage of a processing pipeline. Pipelines can, however, include additional or other stages, such as for example, the stages shown in pipeline 134 shown in FIG. 3.

As shown at the top portion of FIG. 6, a first subpass Pass 1 (i.e., a subpass of a first type, such as geometry buffer rendering subpass 0 in FIG. 5) is executed for bin 1, followed by execution of a second subpass Pass 2 (i.e., a subpass of a different second type, such as first lighting subpass 1 in FIG. 5) of bin 1. Then, the first subpass Pass 1 is executed for bin 2, followed by execution of the second subpass Pass 2 for bin 2.

The curved arrows, extending from RB stages of Pass 1 to PS stages of Pass 2 in FIG. 6, indicate that the execution of the PS stage of a subsequently ordered subpass is dependent on the data resulting from the RB stage in a previously ordered subpass and a cache (e.g., the RB cache) being flushed (i.e., invalidated (INV)). That is, as shown at the top portion of FIG. 6, the subsequently ordered subpass (Pass 2) must wait for the previously ordered subpass (Pass 1) to complete execution, creating a latency in the pipeline. In addition, during this waiting period, the processor is idle which is a waste of resources.

As show in the bottom portion of FIG. 6, however, execution of the previously ordered subpass (i.e., Pass 1) of bin 2 is interleaved between the execution of the same previously ordered subpass (i.e., Pass 1) of bin 1 and the execution of the subsequently ordered subpass (Pass 2) of bin 1. Accordingly, the time period in which no subpass is executed and the processor is idle in the top portion of FIG. 6 is utilized by execution of the previously ordered subpass (i.e., Pass 1) of bin 2, decreasing the latency and improving the overall performance. In addition, as shown in the bottom portion of FIG. 6, latency is further reduced by overlapping (in time) a portion of the execution of the previously ordered subpass (i.e., Pass 1) of bin 1 and portion of the execution of the previously ordered subpass (i.e., Pass 1) of bin 2.

Figure 7:
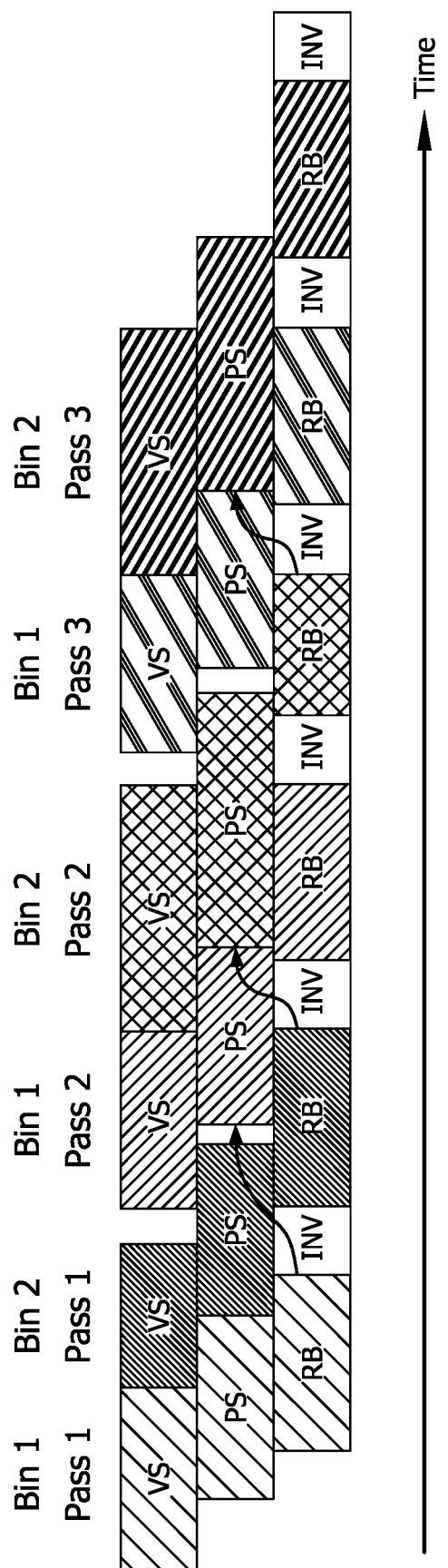
FIG. 7 is a timing diagrams illustrating the example shown in FIG. 6 for 3 bins.

FIG. 7 is a timing diagram illustrating the same procedure shown in the bottom portion of FIG. 6, but implemented using 3 passes for 3 bins. The number of bins and subpasses (shown as passes in FIGS. 6 and 7) are merely examples for simplified explanation purposes. Features of the present application can be implemented for any number of bins and any number of subpasses. In the example shown in FIG. 7, each of the first subpass (Pass 1), the second subpass (Pass 2) and the third subpass (Pass 3) are different from each other. For example, Pass 1 corresponds to a geometry buffer rendering subpass, Pass 2 corresponds to a first lighting subpass and Pass 3 corresponds to a second lighting subpass. Although not shown for simplified explanation, it can be appreciated that features of the present disclosure, including those described with regard to FIG. 7, can be implemented for additional subpasses (i.e., more than three subpasses).

As shown in both the timing diagram at the bottom portion of FIG. 6 and the timing diagram of FIG. 7, execution of the previously ordered first subpass (i.e., Pass 1) of bin 2 is interleaved between the execution of the same previously ordered first subpass (i.e., Pass 1) of bin 1 and the execution of the subsequently ordered second subpass (i.e., Pass 2) of bin 1. In addition, as shown in the timing diagram of FIG. 7, execution of the subsequently ordered second subpass (i.e., Pass 2) of bin 2 is interleaved between the execution of the same subsequently ordered second subpass (i.e., Pass 2) of bin 1 and the execution of a next subsequently ordered third subpass (Pass 3) of bin 1. Accordingly, a time period, in which the processor would otherwise be idle if interleaving was not used, is utilized to execute Pass 2 of bin 2 and further decrease the latency and improve the overall performance. In addition, as shown in the bottom portion of FIG. 6, latency is further reduced by overlapping (in time) a portion of the execution of Pass 2 of bin 1 and a portion of the execution of Pass 2 of bin 2. As can be appreciated, additional latency is decreased for each additional passes of a frame and for a plurality of frames, significantly improving the overall performance.

FIGS. 8-11 illustrate examples of different interleaving modes which can be implemented according to features of the present application. The number of bins, subpasses (shown as passes in FIGS. 8-10 and subpasses in FIG. 11) and commands shown in FIGS. 8-11 are merely examples for simplified explanation purposes. Features of the present application can be implemented for any number of bins and any number of subpasses using any number of commands.

Figure 8:
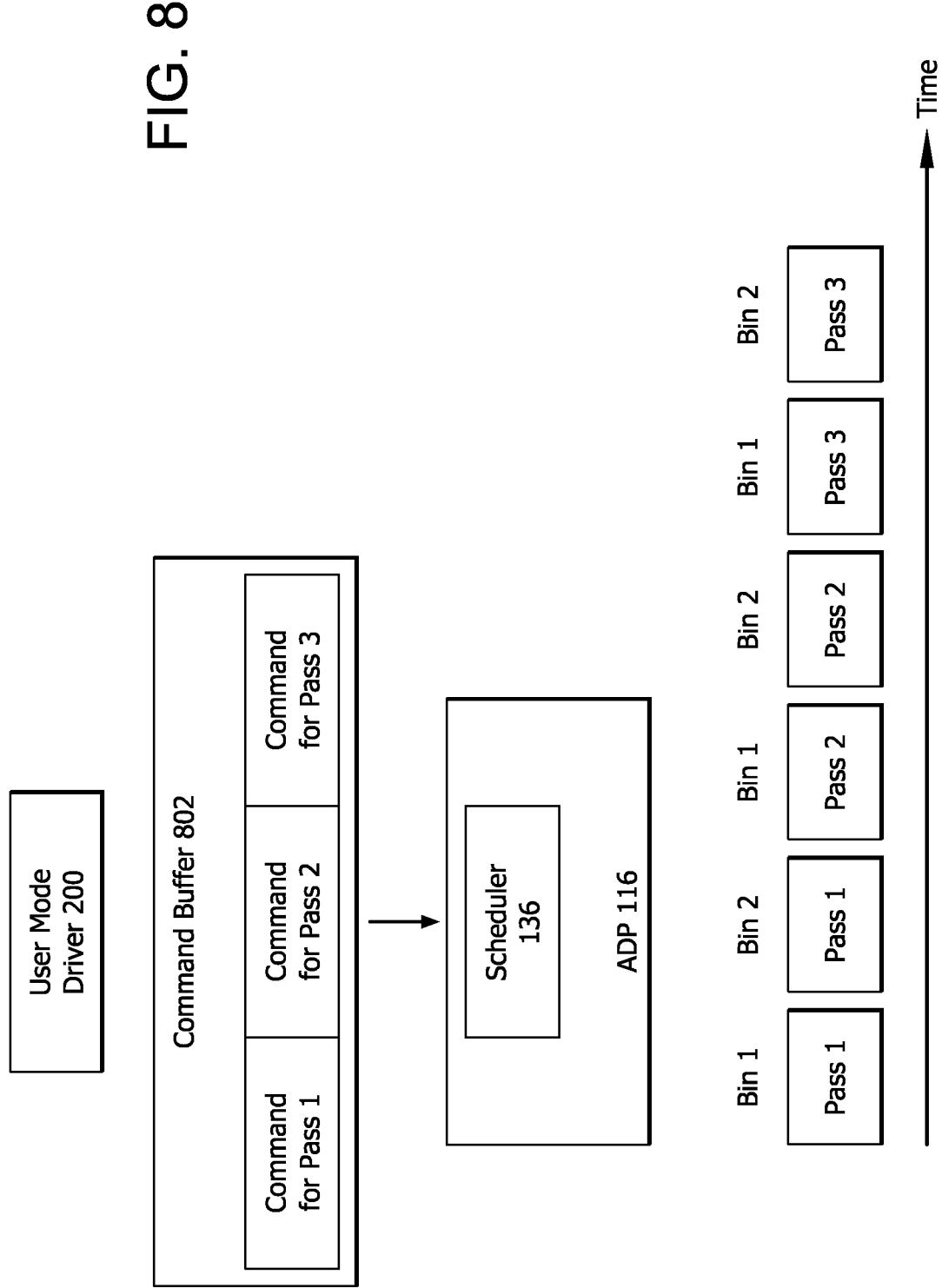
FIG. 8 is a diagram illustrating a first example mode of interleaving subpasses of consecutive bins.

FIG. 8 is a diagram illustrating a first example mode of interleaving subpasses of consecutive bins. With reference to FIG. 8, commands (i.e., command for pass 1, command for pass 2 and command for pass 3) which are issued to the scheduler 136 of APD 115 (e.g., GPU), via user mode driver 200, are stored in a command buffer 802 in a particular order to be executed. When rendering a tile (or bin), different subpasses of the same tile (or bin) are executed in the order specified in the command buffer 802 so that a subsequently ordered subpass of the same tile can read the data resulting from the execution of the previously ordered subpass.

As shown in FIG. 8, the execution of subpass 1 of bin 2 is interleaved between the execution of subpass 1 of bin 1 and subpass 2 of bin 1, during the time period when subpass 2 of bin 1 is waiting for subpass 1 of bin 1 to complete execution. In addition, the execution of subpass 2 of bin 2 is interleaved between the execution of subpass 2 of bin 1 and subpass 3 of bin 1, during the time period when subpass 3 of bin 1 is waiting for subpass 2 of bin 1 to complete execution. As can be appreciated, this process can be continued for additional passes and bins (not shown in FIG. 8).

In the example interleaving mode illustrated in FIG. 8, the execution order of the subpasses are different from the order specified in the command buffer 802. That is, the order specified in the command buffer 802 is subpass 1 (Pass 1), subpass 2 (Pass 2) and then subpass 3 (Pass 3), but the interleaving described above causes the execution of the subpasses 1-3 to be different from the order specified in the command buffer 802 (e.g., subpass 1 for Bin 1, followed by subpass 1 for Bin 2 and then subpass 2 for Bin 1).

Because these time periods, during which subsequently ordered subpasses of a same bin are waiting, are used to execute one or more subpasses of a different tile, the overall latency is reduced. In addition, because the processor is executing one or more subpasses of a different tile during this time period in which the subsequently ordered subpass of a same tile is waiting, the processor is not idle during this time period, resulting in a more efficient use of resources.

Figure 9:
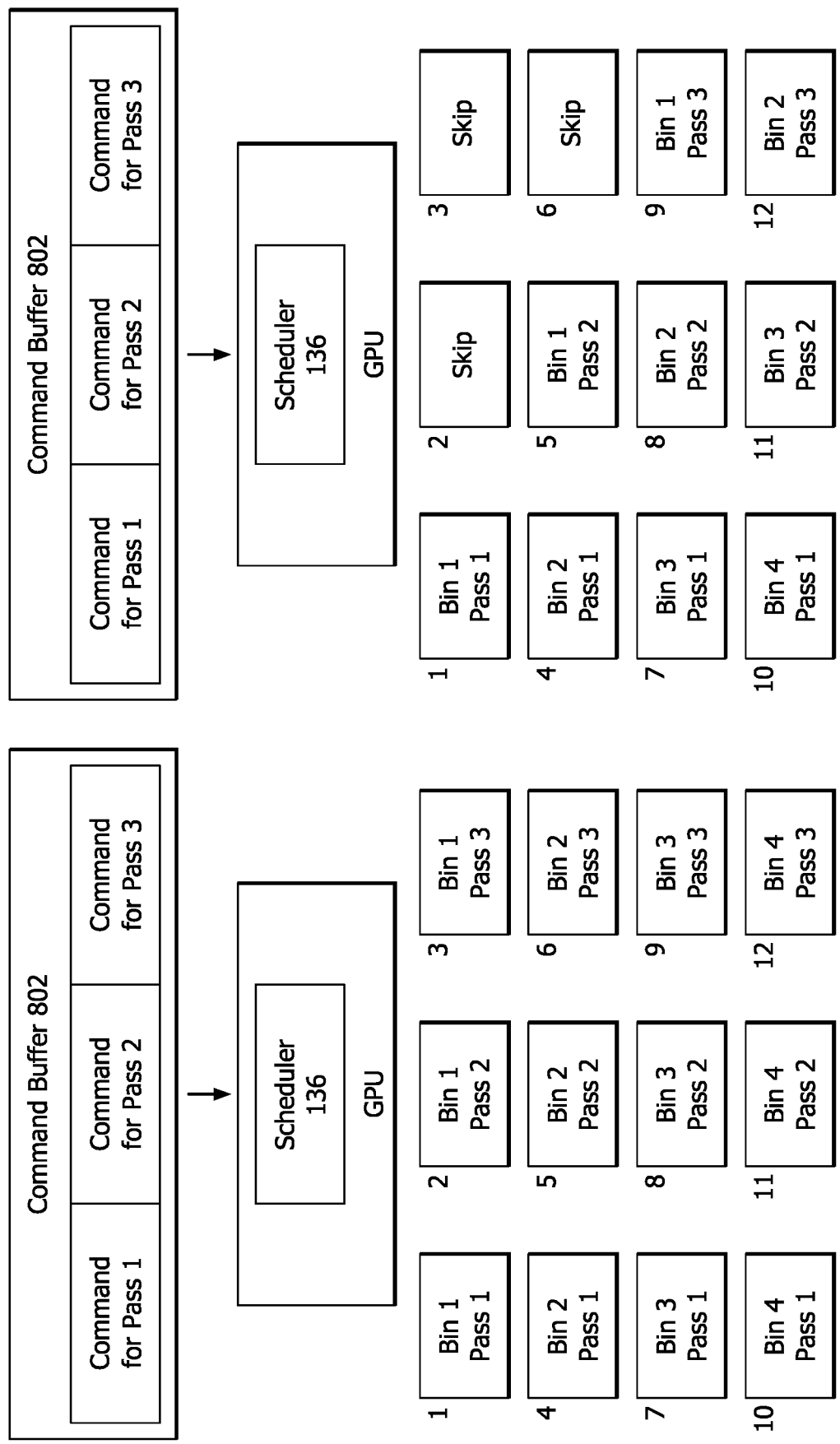
FIG. 9 is a diagram illustrating a second example mode of interleaving subpasses of consecutive bins.
Figure 10:
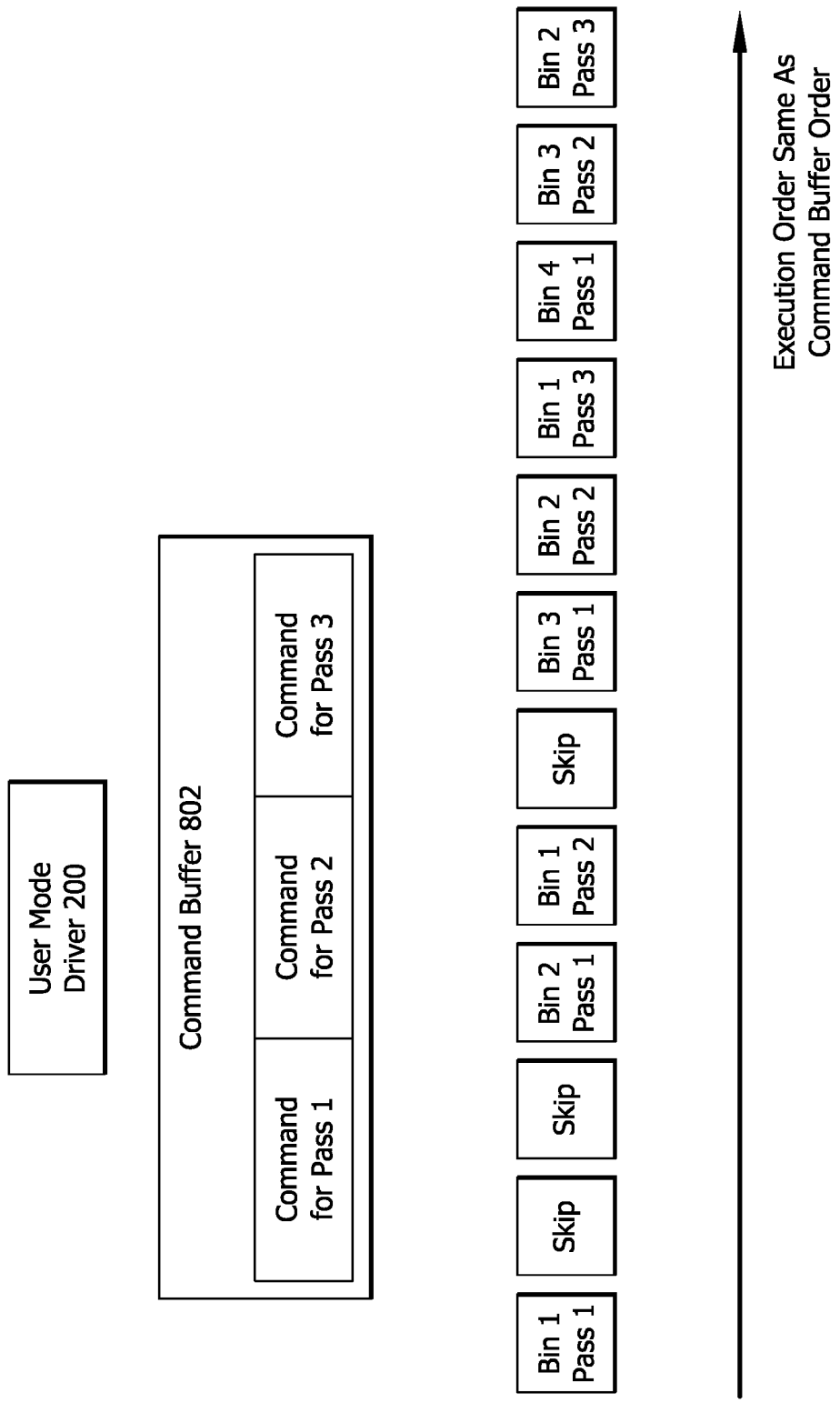
FIG. 10 is a timing diagram illustrating the second example mode shown in FIG. 9.

FIGS. 9 and 10 are diagrams used to illustrate a second example mode of interleaving subpasses of consecutive bins. In the second example mode, subpasses of consecutive bins are interleaved by executing subpasses as skip operations such that the subpasses are executed in the same order specified in the command buffer 802.

FIG. 9 illustrates the differences between the execution order of consecutive subpasses of bins without interleaving and the execution order of consecutive subpasses of bins by interleaving the subpasses according to the second example mode. Three subpasses (i.e., pass 1, pass 2 and pass 3) and 4 bins (Bin 1, Bin 2, Bin 3 and Bin 4) are illustrated in FIGS. 9 and 10 for simplified explanation. Features of the disclosure can be implemented using different numbers of subpasses and different numbers of bins than those shown in FIGS. 9 and 10.

The order of execution of each subpass (i.e., pass1, pass2 and pass3) is shown in matrix form (and aligned vertically with the commands in the command buffers 802 at the top of each diagram in FIG. 9) to better illustrate that the subpasses are executed in the same order specified in the command buffer 802.

The diagram on the left side of FIG. 9 illustrates the execution order of consecutive subpasses of bins without interleaving. The order in which the subpasses are executed are indicated by corresponding numbers 1-12. For example, the first 4 operations are executed in the order of subpass 1 (pass1) of Bin 1, then subpass 2 (pass2) of Bin 1, then subpass 3 (pass3) of Bin 1 and then subpass 1 of Bin 2.

The diagram on the right side of FIG. 9 illustrates the execution order of consecutive subpasses of bins by interleaving the subpasses according to the second example mode. The order in which the operations (i.e., the subpasses and skip execution operations (Skip)) are executed are indicated by corresponding numbers 1-12. For example, subpass 1 (pass1) of Bin 1 is executed, then subpass 2 (pass2) and subpass 3 (pass3) of Bin 1 are executed as skip execution operations (Skip) and then subpass 1 of Bin 2 is executed.

In FIG. 10, the order of execution of each subpass (i.e., subpass 1, subpass 2 and subpass 3) is shown horizontally, over time, to better illustrate the interleaving of the subpasses. In the second example mode shown in FIGS. 9-11, there is some latency caused by the skips. As shown in FIGS. 9 and 10, however, the number of skips (skip operations) decreases over time to no skips.

Due to the skip operations used in the second example mode, a processor will execute subsequently ordered subpasses of some tiles by using (e.g., reading) the data resulting from the execution of a previously ordered subpasses of different corresponding tiles (i.e., wrong tiles).

As described below with regard to FIGS. 11 through 13, features of the present disclosure provide a unique and efficient technique of subpass interleaving by skipping execution of one or more subpasses such that the execution order is the same as the command order while executing subsequently ordered subpasses of the tiles by using (e.g., reading) the data resulting from the execution of a previously ordered subpasses of same corresponding tiles.

Figure 11:
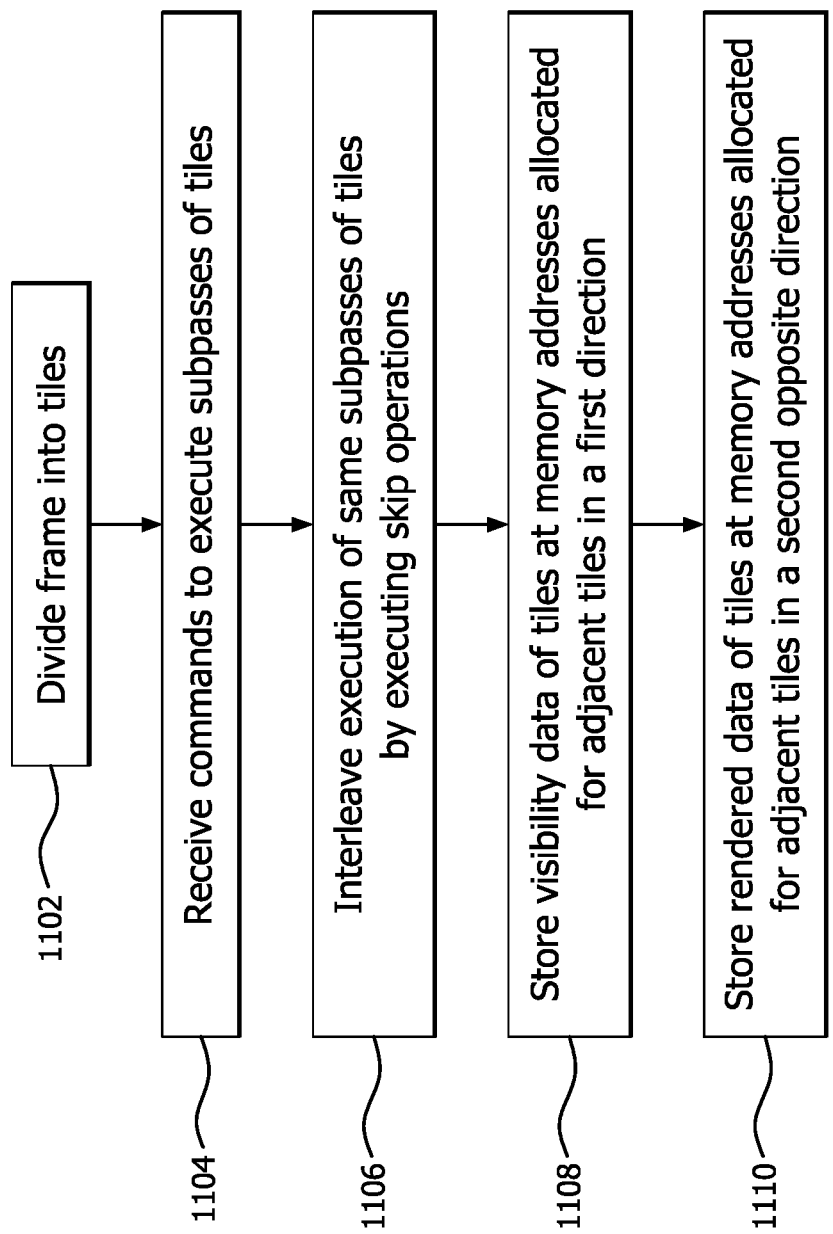
FIG. 11 is a flow diagram illustrating an example method of tiled image rendering according to features of the disclosure.

FIG. 11 is a flow diagram illustrating an example method 1100 of tiled image rendering according to features of the disclosure. As described in more detail below, the method 1100 subpass interleaving is performed by skipping execution of one or more subpasses such that the execution order is the same as the command order while executing subsequently ordered subpasses of the tiles using the data resulting from the execution of a previously ordered subpasses of same corresponding tiles.

In the description below with regard to FIGS. 11-13, the terms "tile" and "bin" are used interchangeably. That is, Bin N also refers to Tile N (e.g., Bin1 also refers to Tile1). In addition, the terms "subpass" and "pass" are used interchangeably. That is, pass N also refers to subpass N (e.g., pass 1 also refers to subpass 1). As shown at block 1102 in FIG. 11, the method 1100 includes dividing a frame to be rendered, into a plurality of tiles (i.e., bins). A frame to be rendered can be split into any number of tiles. Each tile of the frame is rendered before rendering another tile of the frame.

A "direction of traversal" refers to a direction in which the tiles (i.e., bins) of the frames are traversed to generate visibility data of the bins during a visibility data generation phase and to render the data during a rendering phase of the rendering. For example, if a frame is split into four equal sized tiles, tile 1 (bin 1) is at a top left quadrant (row 1, column 1), tile 2 (bin 2) is at a top right quadrant (row 1, column 2), tile 3 (bin 3) is at a bottom left quadrant (row 2, column 1) and tile 4 (bin 4) is at a bottom right quadrant (row 2, column 2). When the tiles are traversed in a forward direction, the tiles are traversed in the order of tile1, tile2, tile3 and tile4. When the tiles are traversed in a backward direction (i.e., opposite the forward direction), the tiles are traversed in the order bin 4, bin 3, bin 2 and bin 1.

As shown at block 1104 in FIG. 11, the method 1100 includes receiving commands to execute a plurality of subpasses of the tiles. For example, commands to execute a plurality of subpasses (i.e., Pass 1, Pass 2 and Pass 3 shown in FIGS. 9 and 10) are received via command buffer 802 are issued to and received by the scheduler 136 of APD 115 (e.g., GPU) via user mode driver 200. The commands are stored in command buffer 802 in a particular order to be executed. When rendering a tile (or bin), different subpasses of the same tile (or bin) are executed in the order specified in the command buffer 802 so that a subsequently ordered subpass of the same tile can read the data resulting from the execution of the previously ordered subpass.

As shown at block 1106 in FIG. 11, the method 1100 includes interleaving execution of same subpasses of multiple tiles (e.g., a subpass of a first tile and a same subpass of a second tile) of the frame.

For example, according to the second example mode described above, the execution of same subpasses of multiple tiles is interleaved by skipping execution (i.e., skip operations) of one or more subpasses such that the plurality of subpasses are executed in the same order in which the commands to execute the plurality of subpasses are stored and issued.

That is, as described above, according to the second example mode described above, the execution of same subpasses of multiple tiles is interleaved by skipping execution (i.e., skip operations) of one or more subpasses such that the plurality of subpasses are executed in the same order in which the commands to execute the plurality of subpasses are stored and issued. However, due to the skip operations, the processor (e.g., APD 116) will read the data for a subsequently ordered subpass of a tile as the data resulting from the execution of a previously ordered subpass of a different tile.

Blocks 1108 and 1110 describe the storing of data during a visibility phase and rendering phase, respectively, of the frame processing.

As shown at block 1108 in FIG. 11, the method 1100 includes storing visibility data at memory addresses allocated for adjacent tiles in a first direction of traversal.

Block 1108 is described with reference to FIG. 12. FIG. 12 is a diagram illustrating an example of storing visibility data of tiles (i.e., bins), during a visibility data generating phase, at memory addresses allocated for adjacent tiles. During the visibility data generation phase, the visibility data of the tiles for subsequently ordered subpasses is stored at the memory addresses allocated for data of corresponding adjacent tiles (i.e., immediate subsequent tile or immediately preceding tile depending on a direction of traversal) and the data of one or more tiles which are pushed out is stored at additional memory addresses reserved for the pushed out tiles.

Figure 12:
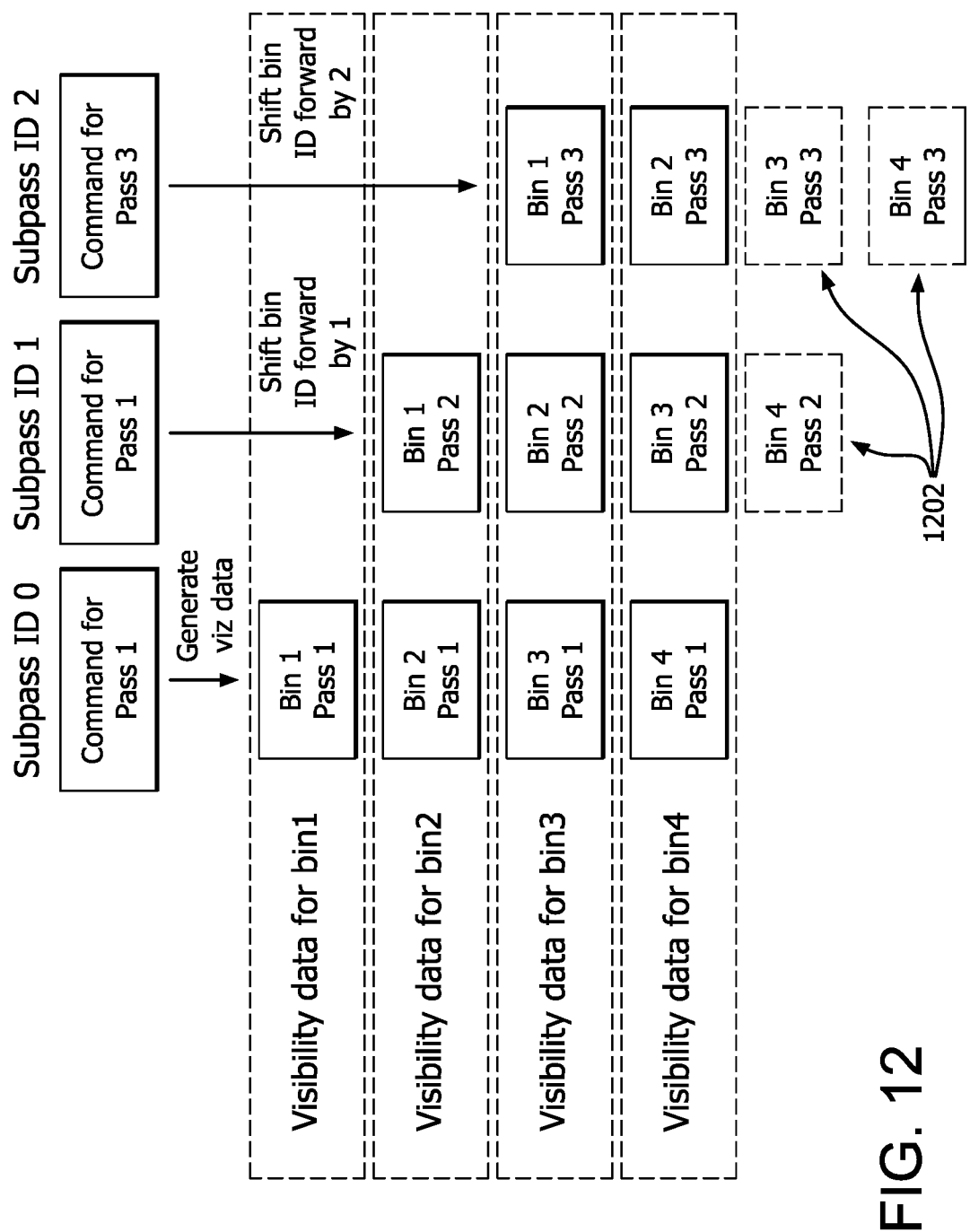
FIG. 12 is a diagram illustrating the storing of visibility data of tiles at memory addresses allocated for adjacent tiles in a forward direction of traversal according to features of the present disclosure.

For simplified explanation purposes, FIG. 12 illustrates the storing of visibility data at memory addresses allocated for adjacent tiles in a forward direction of traversal. That is, for a current tile for which visibility data is being generated, the data is stored at a memory address allocated for a tile adjacent to the current tile in a forward direction of traversal.

FIG. 12 also includes the same number of bins, same number of subpasses and the same execution order of consecutive subpasses of bins as the diagram on the right side of FIG. 9.

The visibility data of tiles is stored at memory addresses according to a subpass ID, which is used to identify a particular subpass and a bin ID which is used to identify a particular bin. For example, as shown in FIG. 12, the first subpass (pass1) is identified by subpass ID 0, the second subpass (pass2) is identified by subpass ID 1 and the third subpass (pass3) is identified by subpass ID 2, The first bin is identified as Bin1, the second bin (in a forward direction of traversal) is identified as Bin2, the third bin is identified as Bin3 and the fourth bin is identified as Bin4.

When using forward traversal (e.g., Bin 1, Bin 2, ... Bin N), during a visibility generation phase, the visibility data of the bins (i.e., tiles) for subsequently ordered subpasses is stored at the memory addresses allocated for data of the corresponding immediate subsequent bins (i.e., the corresponding next bin in the forward order of traversal). In other words, for each subpass y (Pass y) of Bin x, the visibility data is stored at the memory address allocated for bin x+y. For example, for the second subpass (subpass ID y=1), the data for Bin 1 (i.e., x=1) is stored at the memory address allocated for Bin 2 (i.e., Bin x+y=Bin 1+1=Bin 2) and the data for Bin 2 (i.e., x=2) is stored at the memory address allocated for Bin 3 (i.e., Bin x+y=Bin 2+1=Bin 3.

In addition, additional memory portions are reserved for data of one or more bins which are pushed out (i.e., one or more bins at the end of the frame when using forward traversal) and the data for the one or more pushed out tiles are stored at the memory addresses of the additional reserved memory. For example, as indicated by the dashed boxes in FIG. 12, additional memory portions 1202 are reserved to store data for the second subpass (Pass 2) of pushed out Bin 4, data for the third subpass (Pass 3) of pushed out Bin 3, and data for the third subpass (Pass 3) of pushed out Bin 4. Then, in the same manner as described above, for each subpass y of Bin x, the visibility data is stored at the memory address allocated for Bin x+y, but at the additional reserved memory portions 1202.

Block 1110 is described with reference to FIG. 13. As shown at block 1110, the method 1100 includes storing, during a rendering stage, rendered data of tiles at memory addresses allocated for adjacent tiles in a second direction of traversal opposite the first direction of traversal.

Because the data of a bin is shifted, during the visibility phase, to the address of an adjacent bin in first direction of traversal (e.g., forward or backward depending on the direction of traversal), bins are rendered, during the rendering phase, based on the address locations of adjacent bins in the opposite direction of traversal (e.g., backward or forward depending on the direction of traversal).

Figure 13:
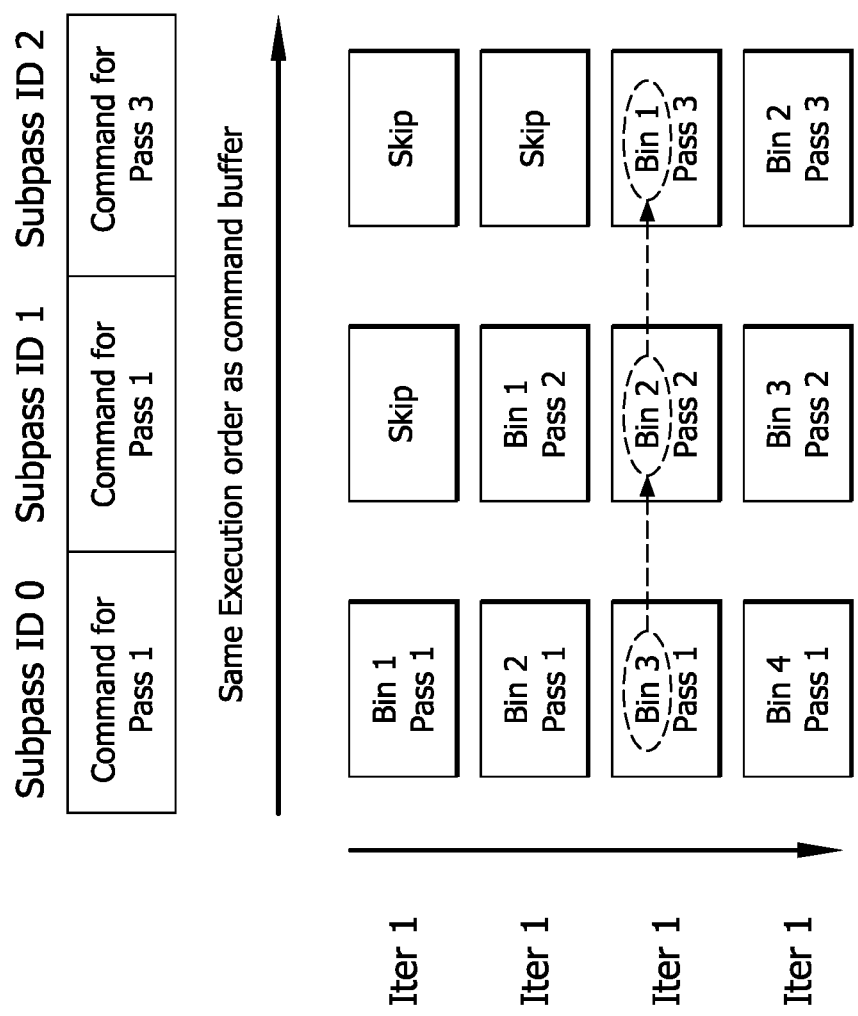
FIG. 13 is a diagram illustrating the storing of rendered data of tiles at memory addresses allocated for corresponding adjacent tiles in a backward direction according to features of the present disclosure.

FIG. 13 is a diagram illustrating the rendering of data of the tiles (i.e., bins) following the visibility data generating phase described above with regard to FIG. 12. Tiles are rendered using the data stored at memory addresses allocated for corresponding adjacent tiles in the backward direction of traversal. That is, a tile is rendered using the data stored at a memory address allocated for a tile that is adjacent to the tile being rendered in a backward direction of traversal (i.e., the immediately preceding tile).

For each iteration x and each subpass y shown in FIG. 13, a determination is made as to which tile is to be rendered. Tiles are rendered using the data stored at the memory address allocated to Bin x-y (in this example because forward traversal was used in the visibility data generating phase). For example, for the third iteration (i.e., x=3) and the second subpass (i.e., subpass ID y=1), a determination is made to render Bin 2 (i.e., x−y=3−1=Bin 2) and Bin 2 is rendered using the data stored at the memory address allocated to Bin 3 as indicated by the dashed arrows and ovals in FIG. 13. For the third iteration (i.e., x=3) and the third subpass (i.e., subpass ID y=2), a determination is made to render Bin 1 (i.e., x−y=3−2=Bin 1) and Bin 1 is rendered using the data stored at the memory address allocated to Bin 2 as further indicated by the dashed arrows and ovals in FIG. 13.

Depending on the direction of traversal, the visibility data of the tiles for subsequently ordered subpasses is stored at the memory addresses allocated for data of either the corresponding immediate subsequent tile (i.e., adjacent tile) or the corresponding immediately preceding tile and the data of one or more tiles which are pushed out is stored at additional memory addresses reserved for the pushed out tiles.

As described above, FIG. 12 illustrates the storing of visibility data at memory addresses allocated for adjacent tiles in a forward direction of traversal and FIG. 13 illustrates rendering tiles using data at memory addresses allocated for adjacent tiles in a backward direction of traversal.

Features of the present disclosure can also be implemented. however, by the storing of visibility data at memory addresses allocated for adjacent tiles in a backward direction of traversal and then rendering tiles using data at memory addresses allocated for adjacent tiles in a forward direction of traversal.

For example, when backward traversal is used (e.g., Bin N, Bin N−1, . . . Bin 1), during a visibility generation phase, the visibility data of the bins (i.e., tiles) for subsequently ordered subpasses is stored at the memory addresses allocated for data of the corresponding immediately preceding bins (i.e., the corresponding previous bin in the forward order of traversal) and the data of one or more bins which are pushed out (i.e., one or more bins at the end of the frame) is stored at additional memory addresses reserved for the pushed out bins. That is, for each Bin x and each subpass ID y, the visibility data in stored at the memory address allocated for Bin x-y.

Then, because the data is shifted backward during the visibility pass, during the rendering phase the bins (i.e., tiles) for subsequently ordered subpasses are rendered using data stored at the memory addresses allocated for data of the corresponding immediate subsequent bins (i.e., the corresponding next bin in the forward order of traversal).

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the APD 116, the scheduler 136, the graphics processing pipeline 134, the compute units 132 and the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of tiled image rendering comprising;
dividing a frame to be rendered into a plurality of tiles;
allocating a respective memory address to each of the plurality of the tiles and a memory address for a pushed out tile,
receiving commands to execute a plurality of subpasses of the tiles;
interleaving execution of same subpasses of multiple tiles of the frame by executing one or more subpasses as skip operations:

storing visibility data for each of the plurality of the tiles that have an adjacent tile in a first direction of traversal at the respective memory addresses allocated for the adjacent tile, wherein the visibility data for a respective tile among the plurality of tiles without a respective adjacent tile in the first direction is stored at the memory address for the pushed out tile, and rendering the tiles for subsequently ordered subpasses using the visibility data stored at memory addresses allocated for corresponding adjacent tiles and the pushed out tile in a second direction of traversal, opposite the first direction of traversal.

2. The method of claim 1, further comprising identifying the subpasses by a subpass identifier.

3. The method of claim 1, further comprising storing the visibility data of the tiles for the subpasses during a visibility generation phase.

4. The method of claim 1, wherein the first direction of traversal is a forward direction of traversal.

5. The method of claim 1, wherein the first direction of traversal is a backward direction of traversal.

6. The method of claim 1, further comprising storing visibility data of one or more pushed out tiles at additional reserved memory addresses.

7. The method of claim 1, wherein the first direction of traversal is a forward direction of traversal and the second direction of traversal is a backward direction of traversal.

8. The method of claim 1, wherein the subpasses are executed in an order in which subpass commands are issued.

9. The method of claim 1, wherein the subpasses are identified by a subpass identifier and during a rendering phase, each subpass comprises a plurality of execution iterations, and the method further comprises determining, which of the tiles to render according to a corresponding execution iteration and a corresponding subpass identifier.

10. A processing device used for tiled image rendering comprising:

memory; and a processor configured to:

divide a frame to be rendered into a plurality of tiles;

allocate a respective memory address of the memory to each of the plurality of the tiles and a memory address of the memory for a pushed out tile, receive commands to execute a plurality of subpasses of the tiles;

interleave execution of same subpasses of multiple tiles of the frame by executing one or more subpasses as skip operations;

store visibility data for each of the plurality of the tiles that have an adjacent tile in a first direction of traversal at the respective memory addresses allocated for the adjacent tile, wherein the visibility data for a respective tile among the plurality of tiles without a respective adjacent tile in the first direction is stored at the memory address for the pushed out tile, and render the tiles for subsequently ordered subpasses using the visibility data stored at the memory addresses allocated for data of corresponding adjacent tiles in a second direction of traversal, opposite the first direction of traversal.

11. The processing device of claim 10, wherein the processor is configured to identify each of the subsequently ordered subpasses by a subpass identifier.

12. The processing device of claim 10, wherein the processor is configured to store the visibility data of the tiles for the subsequently ordered subpasses during a visibility generation phase.

13. The processing device of claim 10, wherein the first direction of traversal is a forward direction of traversal and the corresponding adjacent tiles are corresponding immediately subsequent tiles.

14. The processing device of claim 10, wherein the first direction of traversal is a backward direction of traversal and the corresponding adjacent tiles are corresponding immediately preceding tiles.

15. The processing device of claim 10, wherein the processor is configured to store visibility data of one or more pushed out tiles at additional reserved memory addresses.

16. The processing device of claim 10, wherein the first direction of traversal is a forward direction of traversal and the second direction of traversal is a backward direction of traversal.

17. The processing device of claim 10, wherein the subpasses are executed in an order in which subpass commands are issued.

18. The processing device of claim 10, wherein:

the subpasses are identified by a subpass identifier and each subpass comprises a plurality of execution iterations during a rendering phase, and the processor is further configured to determine, which of the tiles to render according to a corresponding execution iteration and a corresponding subpass identifier.

19. A non-transitory computer readable medium comprising instructions for causing a computer to execute a method of tiled image rendering, the instructions comprising:

dividing a frame to be rendered into a plurality of tiles;

allocating a respective memory address to each of the plurality of the tiles and a memory address for a pushed out tile, receiving commands to execute a plurality of subpasses of the tiles;

interleaving execution of same subpasses of multiple tiles of the frame by executing one or more subpasses as skip operations:

storing visibility data for each of the plurality of the tiles that have an adjacent tile in a first direction of traversal at the respective memory addresses allocated for the adjacent tile, wherein the visibility data for a respective tile among the plurality of tiles without a respective adjacent tile in the first direction is stored at the memory address for the pushed out tile, and rendering the tiles for subsequently ordered subpasses using the visibility data stored at memory addresses allocated for corresponding adjacent tiles and the pushed out tile in a second direction of traversal, opposite the first direction of traversal.

20. The non-transitory computer readable medium of claim 19, wherein the instructions further comprise identifying each of the subsequently ordered subpasses by a subpass identifier.

* * * * *